US006823340B1

(12) United States Patent
Clark

(10) Patent No.: US 6,823,340 B1
(45) Date of Patent: Nov. 23, 2004

(54) PRIVATE COLLABORATIVE PLANNING IN A MANY-TO-MANY HUB

(75) Inventor: Gregory Scott Clark, Austin, TX (US)

(73) Assignee: E2open LLC, Redwood City, CA (US)

( * ) Notice: Subject to any disclaimer, the term of this patent is extended or adjusted under 35 U.S.C. 154(b) by 230 days.

(21) Appl. No.: 09/823,888

(22) Filed: Mar. 30, 2001

(51) Int. Cl.$^7$ ................................................ G06F 17/30
(52) U.S. Cl. ........................................ 707/10; 707/104.1
(58) Field of Search ............................ 707/10, 9, 227, 707/204, 104.1; 709/204, 227, 217; 705/11

(56) References Cited

U.S. PATENT DOCUMENTS

| | | | |
|---|---|---|---|
| 5,497,317 A | 3/1996 | Hawkins et al. | |
| 6,115,690 A | 9/2000 | Wong | |
| 6,202,159 B1 | 3/2001 | Ghafir et al. | |
| 6,314,468 B1 * | 11/2001 | Murphy et al. | 709/217 |
| 2002/0010741 A1 * | 1/2002 | Stewart et al. | 709/204 |
| 2002/0032640 A1 | 3/2002 | LaFore et al. | |
| 2002/0099598 A1 * | 7/2002 | Eicher et al. | 705/11 |
| 2002/0138620 A1 * | 9/2002 | Brown | 709/227 |
| 2002/0138621 A1 * | 9/2002 | Brown | 709/227 |

FOREIGN PATENT DOCUMENTS

| | | |
|---|---|---|
| WO | WO 99/27477 A1 | 6/1999 |
| WO | WO 00/52619 A1 | 9/2000 |
| WO | WO 02/01473 A1 | 1/2002 |
| WO | WO 02/080042 A1 | 10/2002 |
| WO | WO 03/030063 A1 | 4/2003 |
| WO | WO 03/030065 A1 | 4/2003 |

OTHER PUBLICATIONS

Descartes.com. "Inventory Demand Matcher". Descartes Products. Sep. 16, 2002.

* cited by examiner

*Primary Examiner*—Diane D. Mizrahi
(74) *Attorney, Agent, or Firm*—Swernofsky Law Group PC

(57) ABSTRACT

The invention provides a method and system for collaborative planning among multiple collaborators and multiple trading partners, in which individual collaborators and individual trading partners can both make use of global information regarding parties using the system, while still being able to maintain secure and separate information regarding how those individual parties treat their counterparts. The system includes a many-to-many hub at which multiple collaborators and multiple trading partners can exchange information, the hub including a global database having public information about those multiple collaborators and multiple trading partners; the system also includes within the hub a set of private databases having secure and separate information for individual collaborators or individual trading partners.

12 Claims, 4 Drawing Sheets

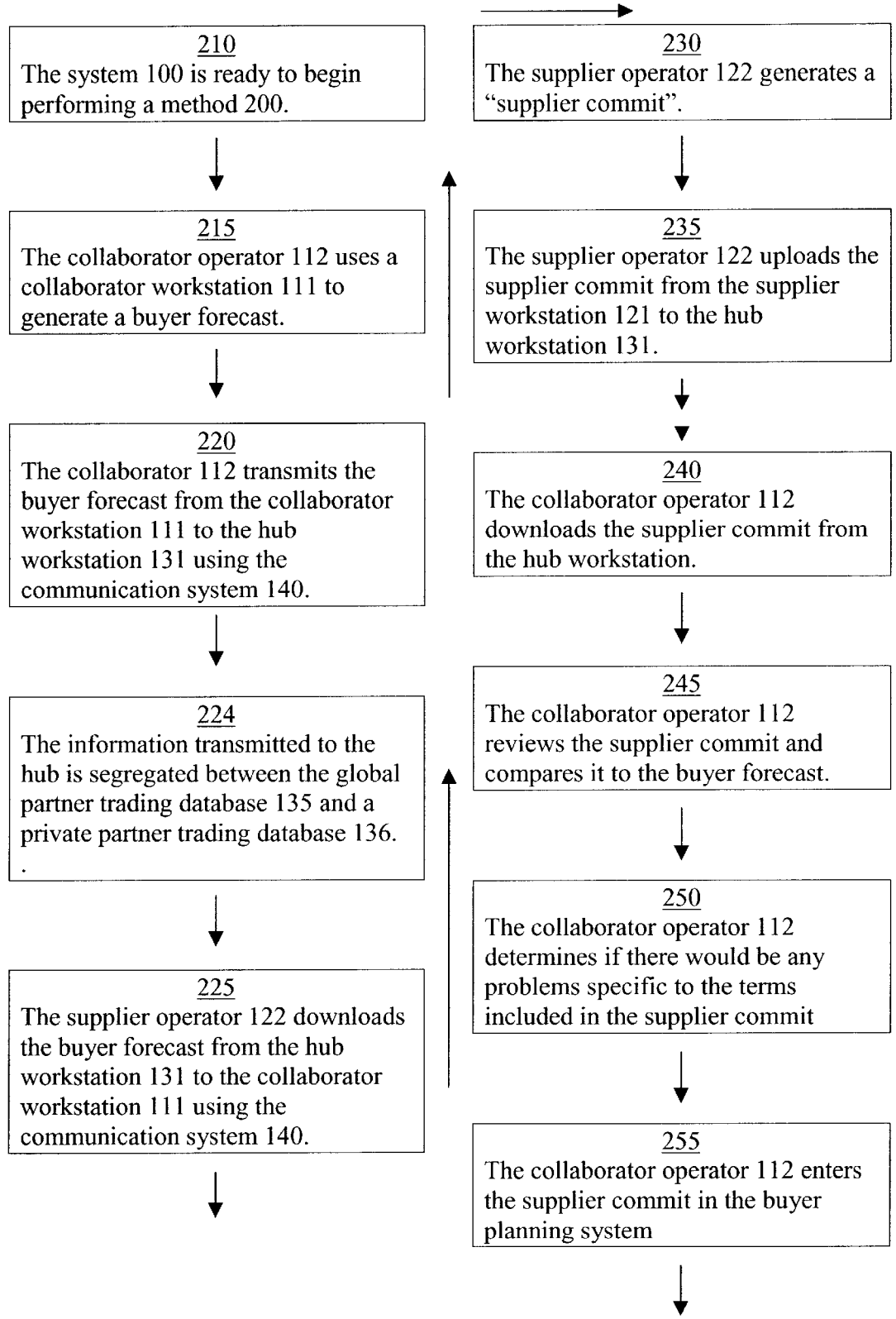

PRIVATE COLLABORATIVE PLANNING IN A MANY-TO-MANY HUB

BACKGROUND OF THE INVENTION

1. Field of the Invention

This invention relates to collaborative planning.

2. Related Art

Manufacturers and integrators of products typically wish to be able to plan their needs for individual parts and subassemblies, to improve their efficiencies in manufacturing or integration of those parts and subassemblies into a completed product. One technique known in the art for planning is called "supply-chain management", in which a collaborator (that is, a manufacturer or integrator of products) contacts its trading partners and informs them of requirements for parts and subassemblies. Each trading partner (that is, a party that produces those parts or subassemblies) responds to those requirements, informing the collaborator of those commitments it is able to make, and for when. The collaborator can then determine when and if it is able to produce and deliver the completed product. Close integration between the collaborator and its trading partners can provide an efficient supply-chain and can allow the collaborator to produce and deliver the completed product at reduced cost.

One problem in the known art is that integration is difficult when there are multiple collaborators or there are multiple trading partners. Collaborators would like to aggregate responses from their trading partners, while trading partners would like to aggregate requests from their collaborators. Moreover, often collaborators would like to be able to treat individual trading partners differently, while trading partners would like to treat individual collaborators differently. For just one example, a collaborator might treat a selected trading partner differently because there is a long relationship with that trading partner, or because that trading partner is more reliable than others, or because that trading partner is better at fixing problems that might occur. However, the known art has been generally unable to solve the problem when there are both multiple collaborators and multiple trading partners.

One known method is to provide a public market for collaborators and trading partners to exchange information. In some known methods, an industry standard for communication between collaborators and trading partners can be implemented as part of the public market and integrated with CRM (customer relations management) systems at both collaborators and trading partners. While this method generally achieves the purpose of allowing collaborators and trading partners to exchange information, it suffers from several drawbacks.

A first drawback is that, in general, each collaborator does not want other collaborators to know the collaborator's confidential information. Similarly, each trading partner does not want other trading partners to know the trading partner's confidential information. This confidential information can include the following:

the design of the product the nature or extent of the collaborator's (or trading partner's) work on that project the particular counter-parties the collaborator (or trading partner) works with the pricing or volume the collaborator (or trading partner) extends to its counter-parties the differences from the industry standard the collaborator (or trading partner) wishes to extend to its counter-parties.

A second drawback is that, in general, each collaborator (or trading partner) would like to be able to have both an aggregate view, directed to all of its counter-parties (or some designated subset thereof), and a specific view, directed to particular counter-parties (or some designated set thereof).

Accordingly, it would be desirable to provide a technique for collaborative planning among multiple collaborators and multiple trading partners, that is not subject to drawbacks of the known art.

SUMMARY OF THE INVENTION

The invention provides a method and system for collaborative planning among multiple collaborators and multiple trading partners, in which individual collaborators and individual trading partners can both make use of global information regarding parties using the system, while still being able to maintain secure and separate information regarding how those individual parties treat their counter-parties. The system includes a many-to-many hub at which multiple collaborators and multiple trading partners can exchange information. The hub includes a global database having public information about those multiple collaborators and multiple trading partners and a set of private databases having secure and separate information for individual collaborators or individual trading partners. In a preferred embodiment, the system includes a collaborators' planning portal, through which individual collaborators can aggregate information about multiple trading partners, and a trading partners' planning portal, through which individual trading partners can aggregate information about multiple collaborators. In a preferred embodiment, the system also includes a set of application middleware capable of providing connectivity between heterogeneous CRM and supply-chain management systems that might be in use at individual collaborators or trading partners.

The invention has general applicability to secure many-to-many communication among multiple parties having differing roles in a system for commercial activity, not limited specifically to multiple collaborators or multiple trading partners. For example, embodiments of the invention can include one or more of, or some combination of, the following applications:

Communication of design data among multiple collaborators and multiple trading partners, where that data is intended to remain secure and separate for individual collaborators, individual trading partners, or individual combinatorial pairs of collaborators and trading partners.

Communication of digital rights to reproduce or use data among multiple distributors and multiple receivers, where that data is intended to remain secure and separate for individual distributors, individual receivers, or individual combinatorial pairs of distributors and receivers.

The feature described supra are also applicable when the Internet dynamics involves many-to-many and multi-business-to-multi-business interactions. Examples of many-to-many and multi-business-to-multi-business interactions include design collaboration, supply chain management and open market ("marting") activities.

Moreover, techniques used by a preferred embodiment of the invention for secure many-to-many communication can be used in contexts other than the specific applications disclosed herein. For example, techniques used by embodiments of the invention for secure and separate information for individual collaborators or trading partners are all generally applicable to fields other than the specific applications disclosed herein.

BRIEF DESCRIPTION OF THE DRAWINGS

FIGS. 2A and 2B show a process flow diagram for a method for private collaborative planning in a many-to-many hub.

DESCRIPTION OF THE PREFERRED EMBODIMENT

Figure 1:
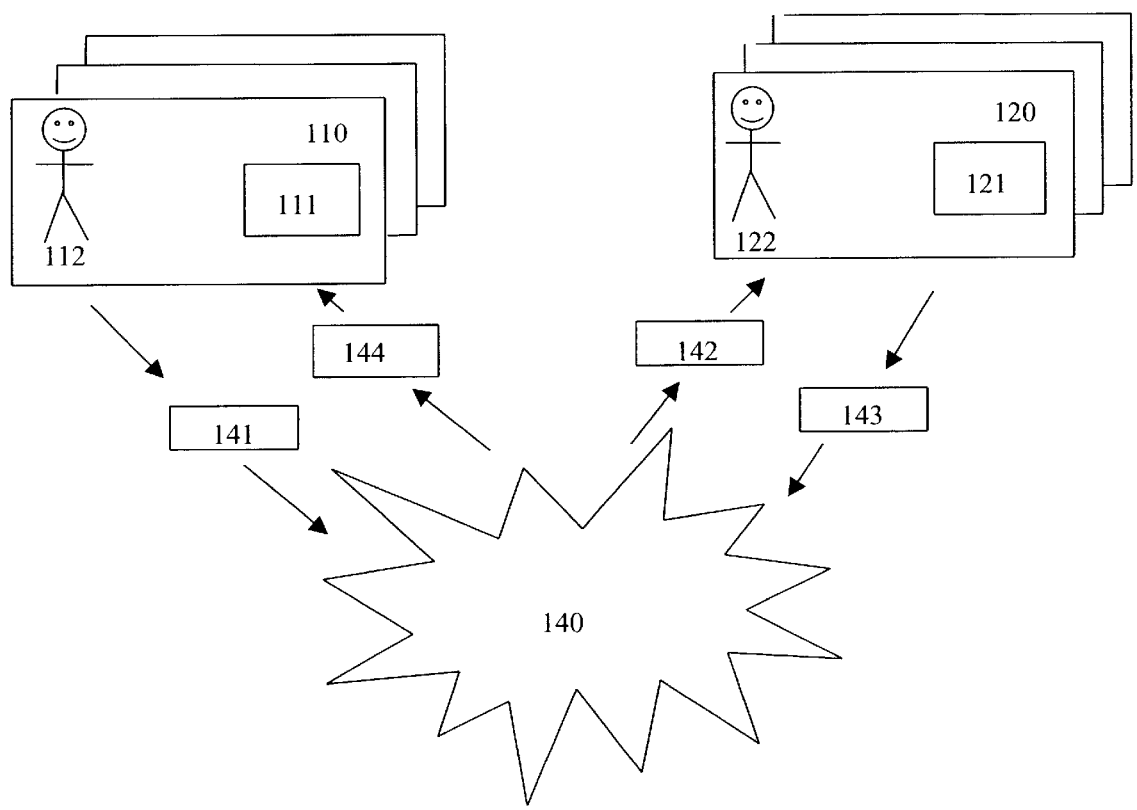
FIG. 1 shows a block diagram of a system for private collaborative planning in a many-to-many hub.
Figure 1:
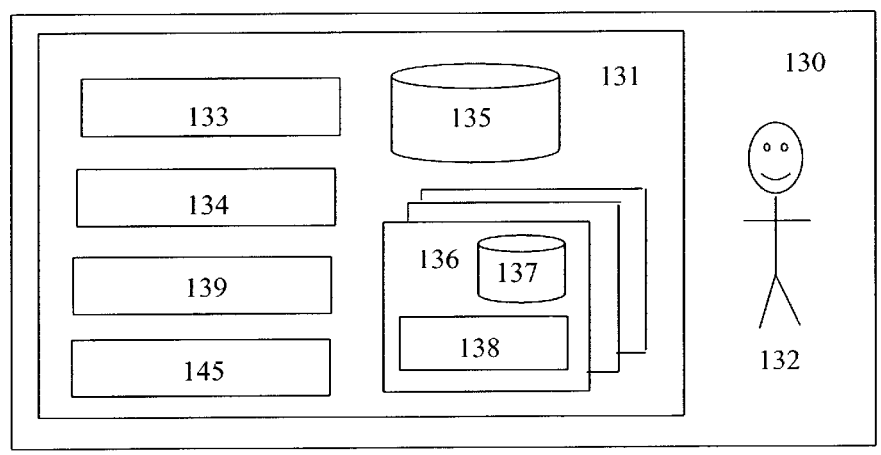

The invention is described herein with regard to preferred steps and data structures. Those skilled in the art will recognize, after perusal of this application, that the described steps and data structures are not limited to any particular processing devices (whether general-purpose or special-purpose processing devices, or specific circuitry). Rather, those of ordinary skill in the art would be able to implement the described steps and data structures, and equivalents thereof, without undue experimentation or further invention. All such implementations are within the scope and spirit of the invention.

Lexicography client and server—As used herein, the phrases, "client" and "server" refer to a relationship between two devices, particularly to their relationship as client and server, not necessarily to any particular physical devices.

client device and server device—As used herein, the phrase "client device" includes any device taking on the role of a client in a client-server relationship (such as an HTTP web client and web server). There is no particular requirement that any client devices must be individual physical devices; they can each be a single device, a set of cooperating devices, a portion of a device, or some combination thereof. As used herein, the phrase "server devics" includes any device taking on the role of a server in a client-server relationship. There is no particular requirement that server devices must be individual physical devices; they can each be a single device, a set of cooperating devices, a portion of a device, or some combination thereof.

logically remote—As used herein, the phrase "logically remote" refers to the relative logical placement or degree of connectivity between two or more computerized systems or two or more elements within a single system. Generally, elements that are relatively proximate to each other may be logically remote if there is a small probability that information will flow between them on a regular basis.

operator—As used herein, the term "operator" refers to any actor capable of performing the functions of an operator ad described herein. An "operator" might comprise an individual person, a set of persons having authority to act in particular way, a proxy for an individual person or set of persons, such as a human secretary or a computer program having the function of forwarding or aggregating or scheduling requests made by others, or even an AI (artificial intelligence) program such as an expert system or otherwise. There is no particular requirement that the operator must have a particular level of authority or intelligence, so long as the operator has the capability of issuing instructions attributed to the operator as described herein.

workstation—As used herein, the term "workstation" refers to any device capable of performing the functions of a workstation as described herein. A workstation might comprise an individual computing device, a set of multiple computing devices operating in concert or cooperation, a portion of a computing device used for a particular function (such as a software package used on an otherwise general-purpose device), or some combination or mixture thereof. There is no particular requirement that a "workstation" include any particular computing device: a "workstation" might include a personal computer, a software package on a server, a handheld computer cooperating with a personal computer or with a server (or both), or a telephone interface to a system such as an interactive voice response system. There is also no particular requirement that multiple workstations used by a single collaborator need be of the same type. For example, a single collaborator might have a single server for access to the hub, a set of personal computers each having separate access to the hub (or alternatively, separate access to a subset of functions of the hub), and a set of handheld computers used by personnel in the field for access to the hub.

System Elements

FIG. 1 shows a block diagram of a system for private collaborative planning in a many-to-many hub.

A system 100 includes a set of individual collaborators 110, a set of individual trading partners 120, and a many-to-many hub 130.

As described herein, each collaborator 110 includes a collaborator workstation 111 and a collaborator operator 112. Similarly, each trading partner 120 includes a trading partner workstation 121 and a trading partner operator 122. Similarly, the hub 130 includes a hub workstation 131 and a hub operator 132.

As noted above, in general when an element is described as a "workstation" it might comprise an individual computing device, a set of multiple computing devices operating in concert or cooperation, a portion of a computing device used for a particular function (such as a software package used on an otherwise general-purpose device), or some combination or mixture thereof. Performing the functions of a unitary device using multiple devices, portions of one device, portions of multiple devices, or variants thereof, are within the general concepts known in the many arts of computer science. Those skilled in the art, after reading this application, would know how to apply general concepts of computer science to the principles of the invention; all such applications are within the scope and spirit of the invention.

Also as noted above, there is no particular requirement that a "workstation" include any particular computing device: a "workstation" might include a personal computer, a software package on a server, a handheld computer cooperating with a personal computer or with a server (or both), or a telephone interface to a system such as an interactive voice response system. There is also no particular requirement that multiple workstations used by a single collaborator need be of the same type. For example, a single collaborator might have a single server for access to the hub, a set of personal computers each having separate access to the hub (or alternatively, separate access to a subset of functions of the hub), and a set of handheld computers used by personnel in the field for access to the hub.

As noted above, in general when an element is described as an "operator" it might comprise an individual person, a set of persons having authority to act in particular way, a proxy for an individual person or set of persons, such as a human secretary or a computer program having the function of forwarding or aggregating or scheduling requests made by others, or even an AI (artificial intelligence) program such as an expert system or otherwise. There is no particular requirements that the operator must have a particular level of authority or intelligence, so long as the operator has the capability of issuing instructions attributed to the operator as described herein.

Those skilled in the art would recognize, after reading this application, that collaborators might also have the role of trading partners, and that trading partners might also have the role of collaborators. For example, a collaborator for a product "B" might also be a trading partner for that product "B" to those collaborators who use product "B" as a subassembly or part in a higher-level product "A". Similarly, those trading partners of the product "B" to the collaborator for the product "A", might themselves be collaborators and use the services of trading partners for products "C" that are subassemblies for the product "B". Thus, potentially every collaborator might also be a trading partner and every trading partner might also be a collaborator.

The individual collaborators 110, individual trading partners 120, and the hub 130, are coupled using a communication system 140. The communication system 140 is capable of transferring messages from a sender to a set of receivers, such as from a collaborator 110 to the hub 130, from a trading partner 120 to the hub 130, or from the hub 130 to either a set of collaborators 110 or from the hub 130 to a set of trading partners 120.

In a preferred embodiment, the communication system 140 includes a computer communication network, such as the Internet. However, in alternative embodiments, the communication system 140 might include an intranet, extranet, VPN (virtual private network), ATM system, a portion of a private or public PSTN (public switched telephone network), a frame relay system, or any other communication technique capable of performing the functions described herein.

Messages Used in the System

As described below with regard to the business and technical processes performed by the system 100, the hub 130 include the capability of transferring at least the following types of messages:

a definition message 141, from a collaborator 110 to the hub 130, describing the amount and nature of the materials and products the collaborator 110 wishes to obtain from trading partners 120 a demand-signal message 142, from the hub 130 to a set of trading partners 110, describing a request for those materials or products the trading partner is on record as capable of supplying, and preferably indicating amounts and due dates a commit-signal message 143, from a trading partner 120 to the hub 130, describing the amount and nature of those materials or products the trading partner is willing to commit to supplying and an elements-missing message 144, from the hub 130 to a collaborator 110, describing the amount and nature of those materials or products that were in described in the definition message 141 but are not yet committed to by trading partners or otherwise unavailable from trading partners.

The Hub

The hub 130 includes a set of elements for providing exchange of information between collaborators 110 with trading partners 120, and for matching requirements by collaborators 110 with commitments by trading partners 120, so as to provide a many-to-many system in which collaborators 110 and trading partners 120 can conduct business.

The hub 130 includes a collaborator portal 133, capable of integrating with individual collaborator workstations 111, capable of receiving messages from the collaborator 110 to the hub 130, and capable of delivering messages from the hub 130 to individual collaborators 110. In a preferred embodiment, the collaborator portal 133 is capable of integrating with any one of a plurality of differing software packages for information exchange between collaborators 110 and trading partners 120. There is no particular requirement that each collaborator workstation 111 use the same or similar information exchange software, or even that multiple collaborator workstations 111 at the same collaborator 110 use the same or similar information exchange software.

Similarly, the hub 130 includes a trading partner portal 134 capable of integrating with individual trading partner workstations 121, capable of receiving messages from the trading partner 120 to the hub 130, and capable of delivering messages from the hub 130 to individual trading partners 120. Similarly, in a preferred embodiment, the trading partner portal 134 is also capable of integrating with any one of a plurality of differing software packages for information exchange between collaborators 110 and trading partners 120. There is no particular requirement that each trading partner workstation 121 use the same or similar information exchange software, or even that multiple trading partner workstations 121 at the same trading partner 120 use the same or similar information exchange software.

The hub 130 includes a portion of its information that is globally available to all collaborators 110 and to all trading partners 120. Such global information might include contact information for individual collaborators 110 or trading partners 120, descriptions of those materials and products typically desired or supplied by individual collaborators 110 or trading partners 120, public specifications of products or test requirements, and other information generally known in the trade or not considered private to any subset of collaborators 110 or trading partners 120. In a preferred embodiment, the hub 130 includes a GPTD (global partner trading database) 135 including public information.

The hub 130 also includes a portion of its information that is not globally available, such as private information only available subject to access control. The hub 130 includes a set of individual supply-chain automatons 136, each of which includes a PPTD (private partner trading database) 137 having private information, private to a particular collaborator 110, and customized supply-chain collaboration software 138 having private instructions regarding supply-chain collaboration and information exchange between the collaborator 110 and its trading partners 120, also private to the particular collaborator 110.

As shown in FIG. 1, each individual supply-chain automaton 136 is specific to a selected collaborator 110, rather than being usable by all collaborators 110 equally.

However, in alternative embodiments, a particular collaborator 110 may provide, using access control or other techniques, for related collaborators 110 to re-use the information in its particular supply-chain automaton 136. For example, if a first collaborator 110 "Engulf and Devour, USA, Inc." has a second collaborator 110 "Minnow, Ltd." as a subsidiary or other affiliated corporation, the first collaborator 110 may choose to share information in its particular supply-chain automaton 136 with the second collaborator 110. In particular alternative embodiments, such sharing may be limited to the sharing collaborators' 110 PPTD 137 (or portions thereof), or to the sharing collaborators 110 customized supply-chain collaboration software 138 (or portions thereof), as the sharing collaborator 110 decides.

The hub 130 includes a set of integration software, including a B2B communication interface 139 and a set of application middleware 145, capable of integrating information from the GPTD 135 and the PPTD 137, and capable of providing for information exchange between individual collaborators 110 using the collaborator portal 133 and individual trading partners 120 using the trading partner portal 133.

Other and further parts of this application describe in other and further detail the elements of the system 100, including elements of the hub 130.

Business Process

Figure 2B:
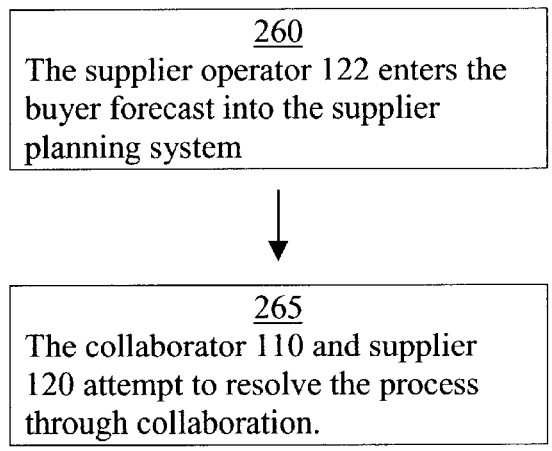

FIGS. 2A and 2B show a process flow diagram for a method for private collaborative planning in a many-to-many hub.

The method 200 is performed by the system 100. Although the method 200 is described serially, the steps of the method 200 can be performed by separate elements in conjunction or parallel, whether asynchronously, in a pipelined manner, or otherwise. There is no particular requirement that the method 200 be performed in the same order in which this description lists the steps, except where so indicated.

At a flow point 210, the system 100 is ready to begin performing a method 200. At this flow point, trading partner agreements for collaborators 110 and trading partners 120 have been executed, the collaborator 110 and trading partner 120 are approved, and forecast notification for all parties is valid.

In a preferred embodiment, the collaborator 110 is generally a buyer, a group of buyers, a manufacturer or similar entity engaged in the production or sale of a product. The collaborator 110 may access all basic user functions on the hub 130 that are associated with the rule of a buyer. Similarly, the trading partner 120 (generally, a seller) may access all basic user functions on the hub 130 that are associated with the role of trading partner. It should be noted that the designations of "collaborator" and "trading partner" refer to roles in a particular transaction or set of transactions and in no way affect the role of a party in subsequent transactions.

In a step 215, the collaborator operator 112 uses a collaborator workstation 111 to generate a buyer forecast. This buyer forecast may include various parameters such as anticipated needs for an upcoming time period, demand data and similar information.

In a step 220, the collaborator operator 112 transmits the buyer forecast from the collaborator workstation 111 to the hub workstation 131 using the communication system 140. Generally, the buyer forecast is included in a definition message 141. In a preferred embodiment, this information is available to trading partners at all times so that trading partners can collaborate on demand signals. The buyer forecast may also be modified by a collaborator 10 in the event that the collaborator's anticipated needs change.

In a step 224, the information transmitted to the hub is segregated between the global partner trading database 135 and a private partner trading database 136. Information that the collaborator 110 wishes to keep private is maintained in the private partner trading database 136. Information that the collaborator wishes to be publicly known is maintained in the global partner trading database 135.

In a step 225, the trading partner operator 122 downloads the buyer forecast from the hub workstation 131 to the collaborator workstation 111 using the communication system 140. Generally, this downloaded information may be included in a demand signal message 142. In a preferred embodiment, the information that the trading partner operator 122 receives does is information found in the global partner trading database 135. After downloading the buyer forecast, the trading partner operator 122 or other personnel associated with the trading partner 130 reviews the terms and projections included therein.

In a step 230, the trading partner operator 122 generates a "trading partner commit". A trading partner commit is a particular type of communication that is responsive to a buyer forecast. Generally, this communication is included in the commit-signal message 143 and includes dates and quantities that the trading partner 120 promises to deliver to the collaborator 110. The trading partner operator 122 may avoid unnecessary data entry by preferably focusing the trading partner commit on exceptions to their ability to respond in a desired manner to the buyer forecast.

In a step 235, the trading partner operator 122 uploads the trading partner commit from the trading partner workstation 121 to the hub workstation 131.

In a step 240, the collaborator operator 112 downloads the trading partner commit from the hub workstation.

In a step 245, the collaborator operator 112 review s the trading partner commit and compares it to the buyer forecast.

In a step 250, the collaborator operator 112 determines if there would be any problems specific to the terms included in the trading partner commit. If the collaborator operator cannot identify any problems, then the method 200 proceeds at step 255. If the collaborator operator identifies one or more problems, then the method 200 proceeds at a step 265.

In a step 255, the collaborator operator 112 enters the trading partner commit in the buyer planning system. In a preferred embodiment, the buyer planning system resides on the hub workstation 131 and stores records describing transactions associated with a particular collaborator 110. In a preferred embodiment, these buyer planning systems are part of the private partner trading database 137 that is associated with the collaborator 110.

In a step 260, the trading partner operator 122 enters the buyer forecast into the trading partner planning system. In a preferred embodiment, the buyer planning system resides on the hub workstation 131 and stores records describing transactions associated with a particular trading partner 120. This buyer planning systems is part of the private partner trading database 137 that is associated with the trading partner 110.

In a step 265, the collaborator 110 and trading partner 120 attempt to resolve the process through collaboration. Communications between the collaborator 110 and the trading partner 120 are conducted by way of the hub 130.

In other embodiments, the method 200 may be initiated by a trading partner 120. In these embodiments, the trading partner 120 generates a trading partner forecast which is reviewed by the collaborator 110.

Exceptions

Figure 3:
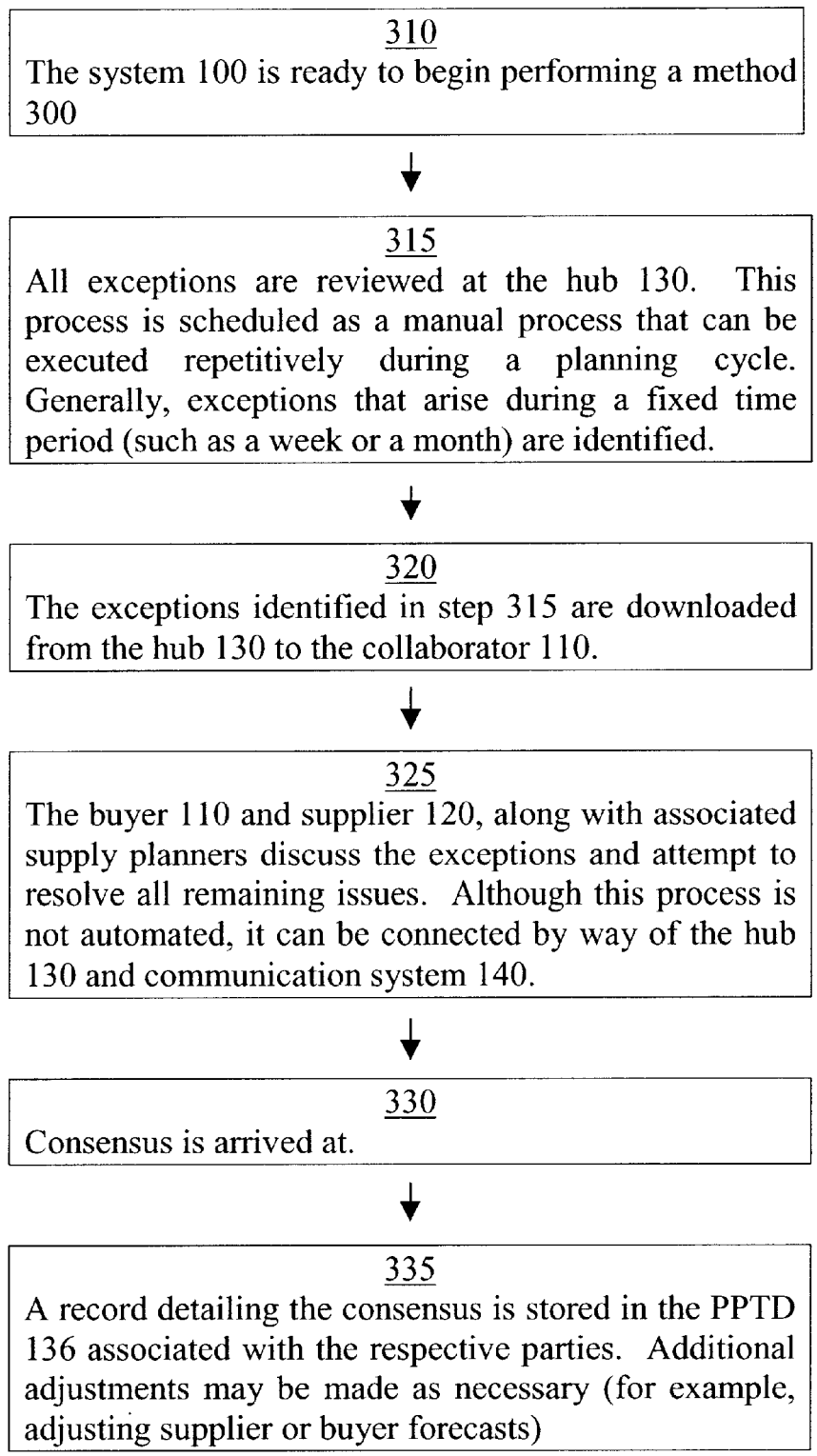
FIG. 3 shows a process flow diagram for a method of treating exceptions that arise using a system for private collaborative planning in a many-to-many hub.

FIG. 3 shows a process flow diagram of a method for many-to-many business communication among collaborators and trading partners.

The method 300 is performed by the system 100. Although the method 300 is described serially, the steps of the method 300 can be performed by separate elements in conjunction or parallel, whether asynchronously, in a pipelined manner, or otherwise. There is no particular requirement that the method 300 be performed in the same order in which this description lists the steps, except where so indicated. Although the hub 130 generally involves the public implementation industrial agreements, the processes described in the method 300 are private. These exception handling processes can be unique and private to each participant in the hub 130. In a preferred embodiment, these exception processes are stored in a memory associated with the hub 130 or edge service equipment.

At a flow point 310, the system 100 is ready to begin performing a method 300. At this flow point, one or more exceptions have arisen such that there is a variance between trading partner agreements for collaborators 110 and trading partners forecasts (described supra). For example, there may be changes in a forecast, differences between forecasts generated by a collaborator 110 and a trading partner 120 or differences in key performance metrics such as forecast error and overstock. This step and all subsequent steps are characterized as private processes and are not public.

In a step 315, all exceptions are reviewed at the hub 130. This process is scheduled as a manual process that can be executed repetitively during a planning cycle. Generally, exceptions that arise during a fixed time period (such as a week or a month) are identified.

In a step 320, the exceptions identified in step 315 are downloaded from the hub 130 to the collaborator 110.

In a step 325, the buyer 110 and trading partner 120, along with associated supply planners discuss the exceptions an d attempt to resolve all remaining issues. Although this process is not automated, it can be connected by way of the hub 130 and communication system 140.

In a step 330, consensus is arrived at. Forecasts may be adjusted (if necessary).

In a step 335, a record detailing the consensus is stored in the PPTD 136 associated with the respective parties. Additional adjustments may be made as necessary (for example, adjusting trading partner or buyer forecasts).

Generality of the Invention

The invention has general applicability to secure many-to-many communication among multiple parties having differing roles in a system for commercial activity, not limited specifically to multiple collaborators or multiple trading partners. For example, embodiments of the invention can include one or more of, or some combination of, the following applications:

Communication of design data among multiple collaborators and multiple trading partners, where that data is intended to remain secure and separate for individual collaborators, individual trading partners, or individual combinatorial pairs of collaborators and trading partners.

Communication of digital rights to reproduce or use data among multiple distributors and multiple receivers, where that data is intended to remain secure and separate for individual distributors, individual receivers, or individual combinatorial pairs of distributors and receivers.

Internet communication involving third party facilitator dynamics.

Moreover, techniques used by a preferred embodiment of the invention for secure many-to-many communication can be used in contexts other than the specific applications disclosed herein. For example, techniques used by embodiments of the invention for secure and separate information for individual collaborators or trading partners are all generally applicable to fields other than the specific applications disclosed herein.

Other and further applications of the invention in its most general form would be clear to those skilled in the art after perusal of this application. The invention would be usable for such other and further applications without undue experimentation or further invention.

Although preferred embodiments are disclosed herein, many variations are possible which remain within the concept, scope and spirit of the invention; these variations would be clear to those skilled in the art after perusal of this application.

What is claimed is:

1. An apparatus that facilitates collaborative planning among a collaborator and one or more other collaborators and trading partners, comprising:

a global database having public information that said collaborator has designated as information to be made available to all of said other collaborators and trading partners; and a private database having private information that said collaborator has designated as information to be kept private or to be shared with only a subset of said other collaborators and trading partners; and a hub disposed for exchange of information among said collaborator and said other collaborators and trading partners, said hub permitting access to said global database and said private database in accordance with the designations;

wherein said public information creates an aggregate view of a product, and said private information creates a specific view of said product.

2. An apparatus as in claim 1, wherein said private database is included in a supply chain automaton specific to said collaborator.

3. An apparatus as in claim 2, wherein said collaborator can permit access to said supply chain automaton by said subset of said other collaborators and trading partners.

4. An apparatus as in claim 1, wherein said global database further has additional public information that one or more of said other collaborators and trading partners has designated as information to made available to all of said other collaborators and trading partners.

5. An apparatus as in claim 1, further comprising one or more additional private databases each having additional private information that one or more of said other collaborators and trading partners has designated as information to be kept private or to be shared with only a subset of said other collaborators and trading partners.

6. An apparatus as in claim 5, wherein each of said additional private databases is included in an additional supply chain automaton specific to one of said other collaborators and trading partners.

7. A method that facilitates collaborative planning among a collaborator and one or more other collaborators and trading partners, comprising:

accepting designation by said collaborator of public information to be made available to all of said other collaborators and trading partners;

maintaining said public information in a global database;

accepting designation by said collaborator of private information to be kept private or to be shared with only a subset of said other collaborators and trading partners;

maintaining said private information in a private database; and facilitating exchange of information among said collaborator and said other collaborators and trading partners, wherein access to said global database and said private database is permitted in accordance with the designations;

wherein said public information creates an aggregate view of a product, and said private information creates a specific view of said product.

8. A method as in claim 7, wherein said private database is included in a supply chain automaton specific to said collaborator.

9. A method as in claim 8, wherein said collaborator can permit access to said supply chain automaton by said subset of said other collaborators and trading partners.

10. A method as in claim 7, further comprising:

accepting designation by one or more of said other collaborators and trading partners of additional public information to be made available to all of said other collaborators and trading partners; and maintaining said additional public information in said global database.

11. A method as in claim 7, further comprising:

accepting designation by one or more of said other collaborators and trading partners of additional private information to be kept private or to be shared with only a subset of said other collaborators and trading partners; and maintaining said additional private information in one or more additional private databases.

12. A method as in claim 11, wherein each of said additional private databases is included in an additional supply chain automaton specific to one of said other collaborators and trading partners.

* * * * *